US012306421B2

(12) United States Patent
Xie et al.

(10) Patent No.: US 12,306,421 B2
(45) Date of Patent: May 20, 2025

(54) ELECTRO-HYDRAULIC VARIFOCAL LENS-BASED METHOD FOR TRACKING THREE-DIMENSIONAL TRAJECTORY OF OBJECT BY USING MOBILE ROBOT

(71) Applicant: SHANGHAI UNIVERSITY, Shanghai (CN)

(72) Inventors: Shaorong Xie, Shanghai (CN); Hengyu Li, Shanghai (CN); Jingyi Liu, Shanghai (CN); Yueying Wang, Shanghai (CN); Shuang Han, Shanghai (CN); Jun Luo, Shanghai (CN)

(73) Assignee: SHANGHAI UNIVERSITY, Shanghai (CN)

( * ) Notice: Subject to any disclaimer, the term of this patent is extended or adjusted under 35 U.S.C. 154(b) by 514 days.

(21) Appl. No.: 17/899,264

(22) Filed: Aug. 30, 2022

(65) Prior Publication Data

US 2023/0063939 A1     Mar. 2, 2023

(30) Foreign Application Priority Data

Aug. 30, 2021    (CN) .......................... 202111006409.0

(51) Int. Cl.
    *G02B 3/14*        (2006.01)
    *G05D 1/00*        (2006.01)

(52) U.S. Cl.
    CPC ............. *G02B 3/14* (2013.01); *G05D 1/0246* (2013.01)

(58) Field of Classification Search
CPC .......... G02B 3/14; G02B 7/36; G05D 1/0246; G06V 10/147; G06V 20/58; G06T 7/292; G06T 7/80; H04N 23/67; H04N 23/673
See application file for complete search history.

(56) References Cited

U.S. PATENT DOCUMENTS

2023/0419629 A1*   12/2023   Huang .................... G06T 7/596

\* cited by examiner

*Primary Examiner* — James C. Jones

(57) ABSTRACT

The present disclosure discloses an electro-hydraulic varifocal lens-based method for tracking a three-dimensional (3D) trajectory of an object by using a mobile robot. By modeling an optical imaging system, a functional relation between a focusing control current of an electro-hydraulic varifocal lens and an optimal imaging object distance is obtained. Based on this functional relation, depth information of the object in focus with respect to a mobile robot camera and an average velocity of the objective within a time interval with respect to a previous moment can be obtained. With this information, 3D coordinates and motion trajectory of the object in a camera coordinate system can be calculated. At the same time, the mobile robot locates positions and attitudes in a world coordinate system in real time, and transforms the 3D coordinates of the tracked object from the camera coordinate system to the world coordinate system.

10 Claims, 1 Drawing Sheet

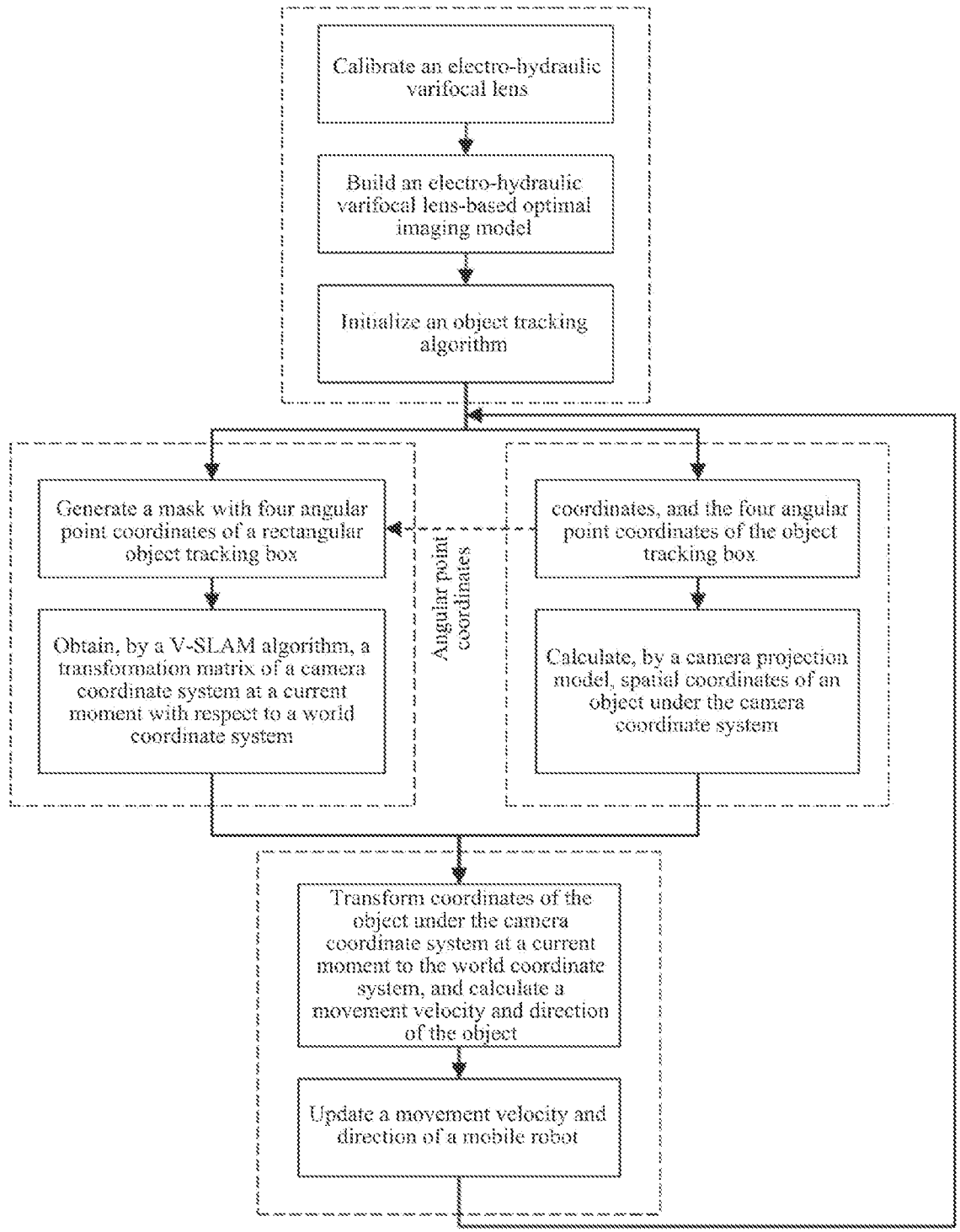

ELECTRO-HYDRAULIC VARIFOCAL LENS-BASED METHOD FOR TRACKING THREE-DIMENSIONAL TRAJECTORY OF OBJECT BY USING MOBILE ROBOT

CROSS REFERENCE TO RELATED APPLICATION

This patent application claims the benefit and priority of Chinese Patent Application No. 202111006409.0, filed on Aug. 30, 2021, the disclosure of which is incorporated by reference herein in its entirety as part of the present application.

TECHNICAL FIELD

The present disclosure belongs to the technical field of computer vision, and relates to the technical field of object tracking methods, in particular to an electro-hydraulic varifocal lens-based method for tracking a three-dimensional (3D) trajectory of an object by using a mobile robot.

BACKGROUND ART

Visual object tracking is not only one of the most basic visual functions for human beings, but a fundamental and important research topic in the field of computer vision, which has received constant attention from multidisciplinary researchers, including researchers on neuroscience and computer science. However, most of the current visual object tracking methods focus on tracking on a two-dimensional image plane, but less on three-dimensional trajectory tracking. Tracking an object simply on a two-dimensional plane may greatly limit the application scenarios of object tracking technique.

At present, 3D trajectory tracking for a visual object is mainly achieved by stereoscopic vision methods, which recover depth information lost during the process of camera projection through devices like a binocular camera or multiple cameras, depth cameras and laser radars. These methods, however, have the disadvantages of complex structure and high equipment cost. In addition, depth cameras and laser radars are also limited by their small range, making it impossible to track an object from a distance.

SUMMARY

An objective of the present disclosure is to provide an electro-hydraulic varifocal lens-based method for tracking a three-dimensional (3D) trajectory of an object by using a mobile robot.

To achieve the aforementioned objective, the present invention adopts the following technical solution:
an electro-hydraulic varifocal lens-based method for tracking a 3D trajectory of an object by using a mobile robot, including:
step 1, calibrating and modeling an electro-hydraulic varifocal lens, selecting a to-be-tracked moving object using an object tracking algorithm, and obtaining an object tracking box;
step 2, carrying out autofocusing on the tracked object using the electro-hydraulic varifocal lens, and recording a focusing control current $I_i$ after the autofocusing is completed, a size $size_i$ of the object tracking box, center point coordinates $(x_i, y_i)$ after undistortion, and four angular point coordinates, and calculating spatial coordinates $(X_{ci}, Y_{ci}, Z_{ci})$ of the object under a camera coordinate system, where the camera is equipped with the electro-hydraulic varifocal lens;
step 3, generating a mask of the moving object with the four angular point coordinates of the object tracking box, and calculating, by a visual simultaneous localization and mapping (V-SLAM) system, a transformation matrix $T_i$ of the camera coordinate system on the mobile robot with respect to a world coordinate system;
step 4, transforming the spatial coordinates $(X_{ci}, Y_{ci}, Z_{ci})$ of the moving object under the camera coordinate system to the world coordinate system and recording corresponding world coordinates $(X_{wi}, Y_{wi}, Z_{wi})$, calculating a movement velocity and direction of the object (the object disclosed herein is a moving object) in combination with world coordinates $(X_{wi-1}, Y_{wi-1}, Z_{wi-1})$ of the object at a previous moment, and updating a movement velocity and direction of the mobile robot; and
step 5, repeating steps 2 to 4 to continuously track the 3D trajectory of the object.

Further, the calibration in step 1 specifically includes: calibrating, by a calibration method, the electro-hydraulic varifocal lens under multiple focusing control currents, and obtaining, by curve fitting, a functional relation between the focusing control currents and camera's intrinsic parameters $f_x$, $f_y$:

$$(f_x, f_y) = H(I) \quad (1)$$

where $f_x$, $f_y$ denote parameters in the camera's intrinsic parameters that change with the focal distance, and are physically defined as equivalent focal distances of a camera in x and y directions of a pixel plane respectively, in a unit of px;
obtaining, by a calibration method, camera's intrinsic parameters $c_x$, $c_y$, s and distortion parameters (the quantity of the distortion parameters depends on the calibration method used) that do not change with the focal distance, where $c_x$, $c_y$ are physically defined as the coordinates of a camera's optical center on the pixel plane, and s is physically defined as a slant parameter between the horizontal and vertical edges of a camera's photosensitive element, all of which are constants; and I denotes a focusing control current of an electro-hydraulic varifocal lens.

Further, the modeling in step 1 specifically includes: building an electro-hydraulic varifocal lens-based optical imaging system model, recording an optimal imaging object distance under multiple focusing control currents by using the model, and conducting curve fitting on the recorded focusing control currents and the corresponding optimal imaging object distance to obtain a relation between the focusing control currents of the electro-hydraulic varifocal lens and the optimal imaging object distance:

$$u = F(I) \quad (2)$$

where u denotes an optimal imaging object distance, and I denotes a focusing control current of the electro-hydraulic varifocal lens.

Further, the carrying out autofocusing on a tracked object using the electro-hydraulic varifocal lens in step 2 includes first autofocusing and subsequent autofocusing, where the first autofocusing specifically includes: (1) searching first an initial focusing control current (focus control current corresponding to a shortest or longest focal distance) at a certain stride n, calculating a sharpness evaluation value for an internal image region of the object tracking box, obtaining a maximum sharpness evaluation value $D_{max}$ and a focusing control current $I_l$ corresponding to the maximum sharpness evaluation value, and setting a sharpness evaluation threshold:

$$K = \alpha D_{max} \quad (3)$$

where α denotes a preset sharpness confidence level, and α<1; and K denotes a sharpness evaluation threshold used in subsequent autofocusing; and (2) after autofocusing is finished, recording a size $size_1$ of the object tracking box in an image, center point coordinates $(x_1, y_1)$ of the object tracking box after undistortion, and four angular point coordinates.

Further, the subsequent autofocusing in step 2 specifically includes: calculating a sharpness evaluation value $D_i$ a of the internal image region of the object tracking box; if Di≥K, directly recording a focusing control current $I_i$ at this moment, a size sizer of the object tracking box in an image, center point coordinates $(x_1, y_1)$ of the object tracking box after undistortion, and four angular point coordinates; if $D_i$<K, reading the size sizer of the object tracking box in the image at this moment, and comparing the size sizer with a size $size_i$ of the object tracking box at last successful focusing (successful focusing indicates that the sharpness evaluation value is greater than or equal to the threshold); if $size_i$<$size_{i-1}$ searching the focusing control current at a certain stride n in the direction the optimal imaging object distance becomes longer, calculating the sharpness evaluation value in the object tracking box, and completing focusing after the sharpness evaluation value is greater than or equal to the sharpness evaluation threshold K; if $size_i'$>$size_{i-1}$, searching the focusing control current at a certain stride n in the direction the optimal imaging object distance becomes shorter, calculating the sharpness evaluation value in the object tracking box, and completing focusing after the sharpness evaluation value is greater than or equal to the sharpness evaluation threshold K; and after the focusing is completed, recording the searched focusing control current $I_i$, the size $size_i$ of the object tracking box in the image after focusing, center point coordinates $(x_i, y_i)$ of the object tracking box after undistortion, and four angular point coordinates.

Further, the undistortion in step 2 specifically includes: calculating, by a distortion model used in the selected calibration method in step 1, an undistorted image in images of a current frame and reading and recording center point coordinates $(x_i, y_i)$ of the object tracking box in the undistorted image.

Further, the calculating spatial coordinates of the object under a camera coordinate system in step 2 is implemented using a camera projection model:

$$\begin{pmatrix} x_i \\ y_i \\ 1 \end{pmatrix} = \frac{1}{Z_{ci}} \begin{pmatrix} f_{xi} & s & c_x \\ 0 & f_{yi} & c_y \\ 0 & 0 & 1 \end{pmatrix} \begin{pmatrix} X_{ci} \\ Y_{ci} \\ Z_{ci} \end{pmatrix} \quad (4)$$

where $(x_i, y_i)$ denote center point coordinates of the object tracking box after undistortion, $c_x$, $c_y$, s denote camera's intrinsic parameters obtained during calibration and do not vary with the focal distance, and $f_{xi}$ and $f_{yi}$ denote camera's intrinsic parameters obtained by substituting a focusing control current $I_i$ at this moment into calibration formula (1); and $X_{ci}$, $Y_{ci}$ and $Z_{ci}$ denote spatial coordinates of a center point of the tracked object under the camera coordinate system, $Z_{ci}$=$u_i$, and $u_i$ denotes an optimal imaging object distance obtained by substituting the focusing control current $I_i$ at this moment into formula (2). The coordinates ($X_{ci}$, $Y_{ci}$, and $Z_{ci}$) of the center point of the tracked object under the camera coordinate system can be calculated by substituting center point coordinates $(x_i, y_i)$ of the object tracking box after undistortion, the camera's intrinsic parameters obtained during calibration and $Z_{ci}$ into the above camera projection model.

Further, the calculating a transformation matrix $T_i$ with the four angular point coordinates of the object tracking box in step 3 includes: generating a mask of the same size as an image captured by the camera equipped with the electro-hydraulic varifocal lens, and processing the mask according to the four angular point coordinates of the object tracking box to assign a pixel value of 0 to an area corresponding to the object tracking box in the mask and a pixel value of 1 to other areas; and multiplying the image captured by the camera with the processed mask, and taking a product thereof as an input of the V-SLAM system to calculate the transformation matrix Ti such that the influence of the moving object on the stability of a V-SLAM algorithm is reduced.

Further, the transforming the spatial coordinates ($X_{ci}$, $Y_{ci}$, $Z_{ci}$) of the moving object under the camera coordinate system to the world coordinate system and recording corresponding world coordinates ($X_{wi}$, $Y_{wi}$, $Z_{wi}$) in step 4 is expressed as:

$$\begin{pmatrix} X_{wi} \\ Y_{wi} \\ Z_{wi} \\ 1 \end{pmatrix} = T_i \begin{pmatrix} X_{ci} \\ Y_{ci} \\ Z_{ci} \\ 1 \end{pmatrix}; \quad (5)$$

where Ti is the 4×4 transformation matrix obtained in step 3, which represents coordinate transformation from the camera coordinate system to the world coordinate system.

Further, the calculating a movement velocity of the object in step 4 includes: calculating an average velocity of world coordinates ($X_{wi}$, $Y_{wi}$, $Z_{wi}$) of the object at a current moment and world coordinates ($X_{wi-1}$, $Y_{wi-1}$, $Z_{wi-1}$) of the object at a previous moment in all directions within a time interval t:

$$v_i = \frac{\sqrt{(X_{wi} - X_{wi-1})^2 + (Y_{wi} - Y_{wi-1})^2 + (Z_{wi} - Z_{wi-1})^2}}{t} \quad (6)$$

$$v_{xi} = \frac{X_{wi} - X_{wi-1}}{t} \quad (7)$$

$$v_{yi} = \frac{Y_{wi} - Y_{wi-1}}{t} \quad (8)$$

$$v_{zi} = \frac{Z_{wi} - Z_{wi-1}}{t} \quad (9)$$

where vi denotes a movement velocity of the object in a movement direction, and $v_{xi}$, $v_{yi}$ and $v_{zi}$ denote movement velocities of the object in x, y and z directions, respectively; and the updating a movement velocity and direction of the mobile robot includes: taking movement velocities of the moving object in all directions at a current moment as movement velocities of the mobile robot in all directions in the world coordinate system:

$$v_{rxi}=v_{xi} \quad (10)$$

$$v_{ryi}=v_{yi} \quad (11)$$

$$v_{rzi}=v_{zi} \quad (12)$$

where $v_{rxi}$, $v_{ryi}$ and $v_{rzi}$ denote movement velocities of the mobile robot in x, y and z directions in the world coordinate system, respectively.

Compared with the prior art, the present disclosure has the following beneficial effects:

The present disclosure does not require stereo vision equipment with complex structure and large size, and the mobile robot can track the 3D trajectory of the object simply using a single camera, which is less costly.

According to the present disclosure, the 3D trajectory of the object can be tracked by the mobile robot, in the meanwhile, the tracked object can be kept in focus in the image through autofocusing, which improves the stability of the object tracking algorithm used, marking a significant progress compared with the prior art.

In the process of using the V-SLAM technology for real-time positioning of the mobile robot, the influence of the moving object on the stability of the V-SLAM algorithm is eliminated through the mask, which improves the robustness of the V-SLAM algorithm in this application scenario.

The electro-hydraulic varifocal lens has the advantages of fast focusing response speed, low energy consumption, compact structure, high repeated positioning accuracy, and fast and accurate focusing; meanwhile, there is high correlation among the control current and the focal distance and the optimal imaging object distance, and the functional relation between the focal distance of the electro-hydraulic varifocal lens and the optical imaging object distance can be obtained by modeling the optical imaging system of the lens; and when the object is in focus after autofocusing, the depth information of the object can be obtained by using this functional relation. The present disclosure provides a new method for tracking a 3D trajectory of an object. The electro-hydraulic varifocal lens keeps the object to be in focus, and the optimal imaging object distance at this moment is taken as the depth of the object with respect to the camera. In this way, the depth information lost in the process of projecting the object to a camera imaging plane can be recovered, and thus the spatial coordinates of the object with respect to the camera coordinate system can be calculated.

The V-SLAM technology enables real-time positioning of the mobile robot. By transforming the spatial coordinates of the object tracked by the mobile robot from the camera coordinate system to the fixed world coordinate system, the 3D trajectory of the object can thus be tracked by the mobile robot.

BRIEF DESCRIPTION OF THE DRAWINGS

FIG. 1 is a flow chart according to Embodiment 1 of the present disclosure.

DETAILED DESCRIPTION OF THE EMBODIMENTS

Embodiment 1

The present disclosure provides an electro-hydraulic varifocal lens-based method for tracking a three-dimensional (3D) trajectory of an object by using a mobile robot, including:

step 1, calibrate and model an electro-hydraulic varifocal lens, select a to-be-tracked moving object using an object tracking algorithm, and obtain an object tracking box as a subsequent focusing window. Generally, the object tracking algorithms can be divided into two categories: first, correlation filtering methods, such as CSK, KCF/DCF, CN, etc.; and second, depth learning methods, such as C-COT, ECO and DLT; and the KCF algorithm is selected in the present embodiment.

The calibration specifically includes: calibrating, by Zhang Zhengyou Calibration Method, the electro-hydraulic varifocal lens under multiple focusing control currents, and obtaining, by curve fitting, a functional relation between the focusing control currents and camera's intrinsic parameters $f_x$, $f_y$:

$$(f_x, f_y)=H(I) \quad (1)$$

where $f_x$, $f_y$ denote parameters in the camera's intrinsic parameters that change with the focal distance, and are physically defined as equivalent focal distances of a camera in x and y directions of a pixel plane respectively, in a unit of px;

obtain, by a calibration method, camera's intrinsic parameters $c_x$, $c_y$, s and distortion parameters $k_1$, $k_2$ (the quantity of the distortion parameters depends on the calibration method used, and only radial distortion is considered in the Zhang Zhengyou Calibration Method) that do not change with the focal distance, where $c_x$, $c_y$ are physically defined as the coordinates of a camera's optical center on the pixel plane, and s is physically defined as a slant parameter between the horizontal and vertical edges of a camera's photosensitive element, all of which are constants; and I denotes a focusing control current of an electro-hydraulic varifocal lens.

The modeling specifically includes: building, by Zemax software, an electro-hydraulic varifocal lens-based optical imaging system model, and setting the radius, thickness, curvature, material and other parameters of the electro-hydraulic varifocal lens used in the Zemax software; recording an optimal imaging object distance under multiple focusing control currents by using the optical imaging system model, and conducting curve fitting on the recorded focusing control currents and the corresponding optimal imaging object to obtain a relation between the focusing control currents of the electro-hydraulic varifocal lens and the optimal imaging object distance:

$$u=F(I) \quad (2)$$

where u denotes an optimal imaging object distance, and I denotes a focusing control current of the electro-hydraulic varifocal lens.

step 2, carry out autofocusing on the tracked object using the electro-hydraulic varifocal lens, and record a focusing control current $I_i$ after the autofocusing is completed, a size $size_i$ of the object tracking box, center point coordinates $(x_i, y_i)$ after undistortion, and four angular point coordinates, and calculate spatial coordinates $(X_{ci}, Y_{ci}, Z_{ci})$ of the object under a camera coordinate system, where the camera is equipped with the electro-hydraulic varifocal lens.

The carrying out autofocusing on a tracked object using the electro-hydraulic varifocal lens includes first autofocusing and subsequent autofocusing, where the first autofocusing specifically includes: (1) searching first an initial focusing control current (focus control current corresponding to a shortest or longest focal distance) at a certain stride n, calculating a sharpness evaluation value for an internal image region of the object tracking box, obtaining a maximum sharpness evaluation value $D_{max}$ and a focusing control current $I_i$ corresponding to the maximum sharpness evaluation value, and setting a sharpness evaluation threshold:

$$K = \alpha D_{max} \qquad (3)$$

where $\alpha$ denotes a preset sharpness confidence level, and $\alpha < 1$; and K denotes a sharpness evaluation threshold used in subsequent autofocusing; and The sharpness evaluation value is calculated by the sharpness evaluation function, and the sharpness evaluation function can be commonly used SMD function, EOG function, Roberts function, Tenengrad function, Brenner function, Laplacian function or SML function. For ease of understanding, the Laplacian function is selected for calculation in this embodiment, which is expressed as:

$$D(f) = \Sigma_y \Sigma_x |G(x,y)| \qquad (13)$$

where $G(x,y)$: denotes convolution of a Laplacian operator at a pixel point $(x,y)$, $(x,y)$ denote coordinates on the pixel plane, and the Laplacian operator is expressed as:

$$L = \frac{1}{6}\begin{bmatrix} 1 & 4 & 1 \\ 4 & -20 & 4 \\ 1 & 4 & 1 \end{bmatrix} \qquad (14)$$

(2) after autofocusing is finished, recording a size $size_1$ of the object tracking box in an image, center point coordinates $(x_1, y_1)$ of the object tracking box after undistortion, and four angular point coordinates.

Further, the subsequent autofocusing specifically includes: calculating a sharpness evaluation value D of the internal image region of the object tracking box; if $D_i \geq K$, directly recording a focusing control current L at this moment, a size $size_i$ of the object tracking box in an image, center point coordinates $(x_i, y_i)$ of the object tracking box after undistortion, and four angular point coordinates; if $D_i < K$, reading the size $size_i$ of the object tracking box in the image at this moment, and comparing the size $size_i$ with a size $size_{i-1}$ of the object tracking box at last successful focusing (successful focusing indicates that the sharpness evaluation value is greater than or equal to the threshold); and if $size_i < size_{i-1}$, searching the focusing control current at a certain stride n in the direction the optimal imaging object distance becomes longer, calculating the sharpness evaluation value in the object tracking box, and completing focusing after the sharpness evaluation value is greater than or equal to the sharpness evaluation threshold K; and if $size_i' size_{i-1}$ searching the focusing control current at a certain stride n in the direction the optimal imaging object distance becomes shorter, calculating the sharpness evaluation value in the object tracking box, and completing focusing after the sharpness evaluation value is greater than or equal to the sharpness evaluation threshold K; and after the focusing is completed, recording the searched focusing control current L, the size $size_i$ of the object tracking box in the image after focusing, center point coordinates $(x_i, y_i)$ of the object tracking box after undistortion, and four angular point coordinates.

The undistortion of the object tracking box specifically includes: calculating, by a distortion model used in the Zhang Zhengyou Calibration Method in step 1, an undistorted image of a current frame, and reading and recording center point coordinates $(x_i, y_i)$ of the object tracking box in the undistorted image.

The radial distortion model used in the Zhang Zhengyou Calibration Method is:

$$x_{distorted} = x(1 + k_1 r^2 + k_2 r^4) \qquad (15)$$

$$y_{distorted} = (1 + k_1 r^2 + k_2 r^4) \qquad (16)$$

$$r = \sqrt{x^2 + y^2} \qquad (17)$$

where $x_{distorted}$ and $y_{distorted}$ denote pixel coordinates of an image after distortion, x and y are ideal pixel coordinates of an image without undistortion, $(x,y)$ denote coordinates on the pixel plane, and $k_1$, $k_2$ denote distortion parameters obtained by calibration. Calculate, by the above distortion model, an undistorted image of a current frame, and read and record center point coordinates $(x_i, y_i)$ of the object tracking box in the image after undistortion.

The calculating spatial coordinates of the object under a camera coordinate system is implemented using a camera projection model:

$$\begin{pmatrix} x_i \\ y_i \\ 1 \end{pmatrix} = \frac{1}{Z_{ci}} \begin{pmatrix} f_{xi} & s & c_x \\ 0 & f_{yi} & c_y \\ 0 & 0 & 1 \end{pmatrix} \begin{pmatrix} X_{ci} \\ Y_{ci} \\ Z_{ci} \end{pmatrix} \qquad (4)$$

where $(x_i, y_i)$ denote center point coordinates of the object tracking box after undistortion, $c_x$, $c_y$, s denote camera's intrinsic parameters obtained during calibration and do not vary with the focal distance, and $f_{xi}$ and $f_{yi}$ denote camera's intrinsic parameters obtained by substituting a focusing control current $I_i$ at this moment into calibration formula (1); and $X_{ci}$, $Y_{ci}$ and $Z_{ci}$ denote spatial coordinates of a center point of the tracked object under the camera coordinate system, $Z_{ci} = u_i$, and $u_i$ denotes an optimal imaging object distance obtained by substituting the focusing control current $I_i$ at this moment into formula (2). The coordinates ($X_{ci}$, $Y_{ci}$, and $Z_{ci}$) of the center point of the tracked object under the camera coordinate system can be calculated by substituting center point coordinates $(x_i, y_i)$ of the object tracking box after undistortion, the camera's intrinsic parameters obtained during calibration and $Z_{ci}$ into the above camera projection model.

step 3, generating a mask of the same size as an image captured by the camera equipped with the electrohydraulic varifocal lens, and processing the mask according to the four angular point coordinates of the object tracking box to assign a pixel value of 0 to an area corresponding to the object tracking box in the mask and a pixel value of 1 to other areas; and multiplying the image captured by the camera with the processed mask, and taking a product thereof as an input of the visual simultaneous localization and mapping (V-SLAM) system to calculate the transformation matrix Ti of the camera coordinate system with respect to the world coordinate system such that the influence of the moving object on the stability of a V-SLAM algorithm is reduced. The V-SLAM algorithm can be selected from ORB-SLAM2, LSD-SLAM, DSO, DTAM and other V-SLAM algorithms that support monocular cameras. For ease of understanding, the ORB-SLAM2 algorithm is selected in this embodiment.

step 4, transform the spatial coordinates ($X_{ci}$, $Y_{ci}$, $Z_{ci}$) of the moving object under the camera coordinate system to the world coordinate system and record corresponding world coordinates ($X_{wi}$, $Y_{wi}$, $Z_{wi}$), calculate a movement velocity and direction of the object in combination with world coordinates ($X_{wi-1}$, $Y_{wi-1}$, $Z_{wi-1}$) of the object at a previous moment, and update a movement velocity and direction of the mobile robot.

The transforming the spatial coordinates ($X_{ci}$, $Y_{ci}$, $Z_{ci}$) of the moving object under the camera coordinate system to the world coordinate system and recording corresponding world coordinates ($X_{wi}$, $Y_{wi}$, $Z_{wi}$) is expressed as:

$$\begin{pmatrix} X_{wi} \\ Y_{wi} \\ Z_{wi} \\ 1 \end{pmatrix} = T_i \begin{pmatrix} X_{ci} \\ Y_{ci} \\ Z_{ci} \\ 1 \end{pmatrix}. \quad (5)$$

where Ti is the 4×4 transformation matrix obtained in step 3, which represents coordinate transformation from the camera coordinate system to the world coordinate system.

calculating a movement velocity of the object includes: calculating an average velocity of world coordinates ($X_{wi}$, $Y_{wi}$, $Z_{wi}$) of the object at a current moment and world coordinates ($X_{wi-1}$, $Y_{wi-1}$, $Z_{wi-1}$) of the object at a previous moment in all directions within a time interval t:

$$v_i = \frac{\sqrt{(X_{wi} - X_{wi-1})^2 + (Y_{wi} - Y_{wi-1})^2 + (Z_{wi} - Z_{wi-1})^2}}{t} \quad (6)$$

$$v_{xi} = \frac{X_{wi} - X_{wi-1}}{t} \quad (7)$$

$$v_{yi} = \frac{Y_{wi} - Y_{wi-1}}{t} \quad (8)$$

$$v_{zi} = \frac{Z_{wi} - Z_{wi-1}}{t} \quad (9)$$

where vi denotes a movement velocity of the object in a movement direction, and $v_{xi}$, $v_{yi}$, and $v_{zi}$ denote movement velocities of the object in x, y and z directions, respectively; and The updating a movement velocity and direction of the mobile robot includes: taking movement velocities of the moving object in all directions at a current moment as movement velocities of the mobile robot in all directions in the world coordinate system:

$$v_{rxi} = v_{xi} \quad (10)$$

$$v_{ryi} = v_{yi} \quad (11)$$

$$v_{rzi} = v_{zi} \quad (12)$$

where $v_{rxi}$, $v_{ryi}$ and $v_{rzi}$ denote movement velocities of the mobile robot in x, y and z directions in the world coordinate system, respectively.

step 5, repeating steps 2 to 4 to continuously track the 3D trajectory of the object.

The present disclosure does not require stereo vision equipment with complex structure and large size, and the mobile robot can track the 3D trajectory of the object simply using a single camera, which is less costly. The 3D trajectory of the object can be tracked by the mobile robot, in the meanwhile, the tracked object can be kept in focus in the image through autofocusing, which improves the stability of the object tracking algorithm used. In the process of using the V-SLAM technology for real-time positioning of the mobile robot, the influence of the moving object on the stability of the V-SLAM algorithm is eliminated through the mask, which improves the robustness of the V-SLAM algorithm in this application scenario.

Embodiment 2

Compared with Embodiment 1, the undistortion of the object tracking box in step 2 in this embodiment includes: directly calling an undistortion function of OpenCV, introducing distortion parameters obtained through calibration, and conducting undistorting on an image of a current frame; and reading and recording center point coordinates ($x_i$, $y_i$) of an object tracking box in the undistorted image.

What is claimed is:

1. An electro-hydraulic varifocal lens-based method for tracking a three-dimensional (3D) trajectory of an object by using a mobile robot, comprising:

step 1, calibrating and modeling an electro-hydraulic varifocal lens, selecting a to-be-tracked moving object using an object tracking algorithm, and obtaining an object tracking box;

step 2, carrying out autofocusing on the tracked object using the electro-hydraulic varifocal lens, and recording a focusing control current after the autofocusing is completed, a size of the object tracking box, center point coordinates after undistortion, and four angular point coordinates, and calculating spatial coordinates of the object under a camera coordinate system;

step 3, generating a mask of the moving object with the four angular point coordinates of the object tracking box, and calculating, by a Visual Simultaneous Localization and Mapping (V-SLAM) system, a transformation matrix of the camera coordinate system on the mobile robot with respect to a world coordinate system;

step 4, transforming the spatial coordinates of the moving object under the camera coordinate system to the world coordinate system and recording corresponding world coordinates, calculating a movement velocity and direction of the object in combination with world coordinates of the object at a previous moment, and updating a movement velocity and direction of the mobile robot; and step 5, repeating steps 2 to 4 to continuously track the 3D trajectory of the object.

2. The electro-hydraulic varifocal lens-based method for tracking a 3D trajectory of an object by using a mobile robot according to claim 1, wherein the calibration in step 1 specifically comprises: calibrating, by a calibration method, the electro-hydraulic varifocal lens under multiple focusing control currents, and obtaining, by curve fitting, a functional relation between the focusing control currents and $f_x$, $f_y$:

$$(f_x, f_y) = H(I) \quad (1)$$

wherein $f_x$, $f_y$ denote equivalent focal distances of a camera in x and y directions of a pixel plane respectively, in a unit of px; and I denotes a focusing control current; and obtaining coordinates of a camera's optical center on the pixel plane, and a slant parameter between horizontal and vertical edges of a camera's photosensitive element.

3. The electro-hydraulic varifocal lens-based method for tracking a 3D trajectory of an object by using a mobile robot according to claim 2, wherein the modeling in step 1 specifically comprises: building an electro-hydraulic varifocal lens-based optical imaging system model, recording an optimal imaging object distance under multiple focusing control currents by using the model, and conducting curve fitting on the recorded focusing control currents and the corresponding optimal imaging object distance to obtain a relation between the focusing control currents and the optimal imaging object distance:

$$u = F(I) \quad (2)$$

wherein u denotes an optimal imaging object distance.

4. The electro-hydraulic varifocal lens-based method for tracking a 3D trajectory of an object by using a mobile robot according to claim 3, wherein the carrying out autofocusing on a tracked object using the electro-hydraulic varifocal lens in step 2 comprises first autofocusing and subsequent autofocusing; wherein the first autofocusing specifically comprises: (1) searching an initial focusing control current at a certain stride, calculating a sharpness evaluation value for an internal image region of the object tracking box, obtaining a maximum sharpness evaluation value and a focusing control current corresponding to the maximum sharpness evaluation value, and setting a sharpness evaluation threshold:

$$K = \alpha D_{max} \quad (3)$$

wherein $\alpha$ denotes a preset sharpness confidence level, and $\alpha < 1$; and $D_{max}$ denotes a maximum sharpness evaluation value; and (2) after the autofocusing is finished, recording a size of the object tracking box in an image, center point coordinates after undistortion, and four angular point coordinates.

5. The electro-hydraulic varifocal lens-based method for tracking a 3D trajectory of an object by using a mobile robot according to claim 4, wherein the subsequent autofocusing in step 2 specifically comprises: calculating a sharpness evaluation value $D_i$ of the internal image region of the object tracking box; if $D_i \geq K$, directly recording a focusing control current $I_i$ at this moment, a size $size_i$ of the object tracking box in an image, center point coordinates of the object tracking box after undistortion, and four angular point coordinates; if $D_i < 1K$ reading the size $size_i$ of the object tracking box in the image at this moment, and comparing the size $size_i$ with a size $size_{i-1}$ of the object tracking box at last successful focusing; it $size_i < size_{i-1}$ searching the focusing control current at a certain stride in the direction the optimal imaging object distance becomes longer, calculating the sharpness evaluation value in the object tracking box, and completing focusing after the sharpness evaluation value is greater than or equal to the sharpness evaluation threshold K; if $size_i > size_{i-1}$ searching the focusing control current at a certain stride n in the direction the optimal imaging object distance becomes shorter, calculating the sharpness evaluation value in the object tracking box, and completing focusing after the sharpness evaluation value is greater than or equal to the sharpness evaluation threshold; and after the focusing is completed, recording the searched focusing control current, the size of the object tracking box in the image after focusing, center point coordinates after undistortion, and four angular point coordinates.

6. The electro-hydraulic varifocal lens-based method for tracking a 3D trajectory of an object by using a mobile robot according to claim 5; wherein the undistortion in step 2 comprises: calculating an undistorted image in images of a current frame according to a distortion model used in the calibration method al step 1, and reading and recording center point coordinates of the object tracking box in the undistorted image.

7. The electro-hydraulic varifocal lens-based method for tracking a 3D trajectory of an object by using a mobile robot according to claim 6, wherein the calculating spatial coordinates of the object under a camera coordinate system in step 2 is implemented using a camera projection model:

$$\begin{pmatrix} x_i \\ y_i \\ 1 \end{pmatrix} = \frac{1}{Z_{ci}} \begin{pmatrix} f_{xi} & s & c_x \\ 0 & f_{yi} & c_y \\ 0 & 0 & 1 \end{pmatrix} \begin{pmatrix} X_{ci} \\ Y_{ci} \\ Z_{ci} \end{pmatrix} \quad (4)$$

wherein $(x_i, y_i)$ denotes center point coordinates of the object tracking box after undistortion, $c_x$ and $c_y$ denote coordinates of the camera's optical center on the pixel plane, s denotes a slant parameter between horizontal and vertical edges of a camera's photosensitive element, and $f_{xi}$ and $f_{yi}$ denote camera's intrinsic parameters under a focusing control current $I_i$ at this moment, $X_{ci}$, $Y_{ci}$ and $Z_{ci}$ denote spatial coordinates of a center point of the tracked object under the camera coordinate system, $Z_{ci} = u_i$, and $u_i$ denotes an optimal imaging object distance obtained under the focusing control current $I_i$ al this moment.

8. The electro-hydraulic varifocal lens-based method for tracking a 3D trajectory of an object by using a mobile robot according to claim 7, wherein the calculating a transformation matrix in step 3 comprises: generating a mask of the same size as an image captured by the camera, and processing the mask according to the four angular point coordinates of the object tracking box to assign a pixel value of 0 to an area corresponding to the object tracking box in the mask and a pixel value of 1 to other areas, and multiplying the image captured by the camera with the processed mask, and taking a product thereof as an input of the V-SLAM system to calculate the transformation matrix.

9. The electro-hydraulic varifocal lens-based method for tracking a 3D trajectory of an object by using a mobile robot according to claim 8, wherein the transforming the spatial coordinates of the moving object under the camera coordinate system to the world coordinate system and recording corresponding world coordinates in step 4 is expressed as:

$$\begin{pmatrix} X_{wi} \\ Y_{wi} \\ Z_{wi} \\ 1 \end{pmatrix} = T_i \begin{pmatrix} X_{ci} \\ Y_{ci} \\ Z_{ci} \\ 1 \end{pmatrix} \quad (5)$$

wherein $(X_{ci}, Y_{ci}, Z_{ci})$ denote spatial coordinates of the moving object under the camera coordinate system, $(X_{wi}, Y_{wi}, Z_{wi})$ denote world coordinates of the moving object under the world coordinate system, and Ti denotes a transformation matrix.

10. The electro-hydraulic varifocal lens-based method for tracking a 3D trajectory of an object by using a mobile robot according to claim 9, wherein in step 4, the calculating a movement velocity of the moving object comprises: calculating an average velocity of world coordinates of the moving object at a current moment and world coordinates of the moving object at a previous moment in all directions within a time interval t:

$$v_i = \frac{\sqrt{(X_{wi} - X_{wi-1})^2 + (Y_{wi} - Y_{wi-1})^2 + (Z_{wi} - Z_{wi-1})^2}}{t} \quad (6)$$

$$v_{xi} = \frac{X_{wi} - X_{wi-1}}{t} \quad (7)$$

$$v_{yi} = \frac{Y_{wi} - Y_{wi-1}}{t} \quad (8)$$

$$v_{zi} = \frac{Z_{wi} - Z_{wi-1}}{t} \quad (9)$$

wherein $(X_{wi}, Y_{wi}, Z_{wi})$ denote world coordinates of the moving object at a current moment, $(X_{wi-1}, Y_{wi-1}, Z_{wi-1})$ denote world coordinates of the moving object at a previous moment, vi denotes a movement velocity of the moving object in a movement direction, and $v_{xi}$, $v_{yi}$, and $v_{zi}$ denote movement velocities of the moving object in x, y and z directions, respectively and the updating a movement velocity and direction of the mobile robot comprises: taking movement velocities of the moving object in all directions at a current moment as movement velocities of the mobile robot in all directions in the world coordinate system:

$$v_{rxi} = v_{xi} \quad (10)$$

$$V_{ryi} = v_{yi} \quad (11)$$

$$v_{rzi} = v_{zi} \quad (12)$$

wherein $v_{rxi}$, $v_{ryi}$ and $v_{rzi}$ denote movement velocities of the mobile robot in x, y and z directions in the world coordinate system, respectively.

\* \* \* \* \*